(12) United States Patent
Fukuta et al.

(10) Patent No.: US 12,004,252 B2
(45) Date of Patent: *Jun. 4, 2024

(54) MOBILE COMMUNICATION SYSTEM, USER TERMINAL, AND BASE STATION

(71) Applicant: KYOCERA Corporation, Kyoto (JP)

(72) Inventors: Noriyoshi Fukuta, Yokohama (JP); Kugo Morita, Yokohama (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/506,534

(22) Filed: Oct. 20, 2021

(65) Prior Publication Data

US 2022/0046743 A1    Feb. 10, 2022

Related U.S. Application Data

(63) Continuation of application No. 16/813,480, filed on Mar. 9, 2020, now Pat. No. 11,178,721, which is a
(Continued)

(51) Int. Cl.
*H04W 76/27* (2018.01)
*H04W 8/00* (2009.01)
(Continued)

(52) U.S. Cl.
CPC ........... *H04W 76/27* (2018.02); *H04W 8/005* (2013.01); *H04W 48/10* (2013.01); *H04W 48/12* (2013.01);
(Continued)

(58) Field of Classification Search
CPC . H04W 76/023; H04W 8/005; H04W 52/383; H04W 40/10; H04W 52/00;
(Continued)

(56) References Cited

U.S. PATENT DOCUMENTS

2011/0098043 A1    4/2011    Yu et al.
2012/0115469 A1    5/2012    Chen et al.
(Continued)

FOREIGN PATENT DOCUMENTS

JP    2008-520169 A    6/2008
JP    2013-005283 A    1/2013
(Continued)

OTHER PUBLICATIONS

International Search Report issued in PCT/JP2014/053742; dated Mar. 18, 2014.
(Continued)

*Primary Examiner* — Romani Ohri
(74) *Attorney, Agent, or Firm* — Studebaker & Brackett PC (57) ABSTRACT

A user equipment, method, and chipset receive from a base station resource information indicating usable radio resources for data transmitted in the direct communication, detect a power when receiving a radio signal directly transmitted from another user terminal, and determine, based on the result of the process, a radio resource used to transmit the data from among the usable radio resources indicated by the resource information.

3 Claims, 7 Drawing Sheets

Related U.S. Application Data continuation of application No. 16/183,084, filed on Nov. 7, 2018, now Pat. No. 10,602,566, which is a continuation of application No. 15/886,403, filed on Feb. 1, 2018, now Pat. No. 10,129,923, which is a continuation of application No. 15/673,949, filed on Aug. 10, 2017, now Pat. No. 9,913,312, which is a continuation of application No. 15/167,525, filed on May 27, 2016, now Pat. No. 9,769,864, which is a continuation of application No. 14/769,007, filed as application No. PCT/JP2014/053742 on Feb. 18, 2014, now abandoned.

(60) Provisional application No. 61/766,548, filed on Feb. 19, 2013.

(51) Int. Cl.

| | | |
|---|---|---|
| *H04W 48/10* | (2009.01) | |
| *H04W 48/12* | (2009.01) | |
| *H04W 52/04* | (2009.01) | |
| *H04W 52/38* | (2009.01) | |
| *H04W 72/04* | (2023.01) | |
| *H04W 72/51* | (2023.01) | |
| *H04W 76/10* | (2018.01) | |
| *H04W 76/14* | (2018.01) | |
| *H04W 92/18* | (2009.01) | |
| *H04W 52/36* | (2009.01) | |
| *H04W 72/23* | (2023.01) | |
| *H04W 88/06* | (2009.01) | |
| *H04W 88/10* | (2009.01) | |

(52) U.S. Cl.
CPC ........... *H04W 52/04* (2013.01); *H04W 52/38* (2013.01); *H04W 52/383* (2013.01); *H04W 72/04* (2013.01); *H04W 72/51* (2023.01); *H04W 76/10* (2018.02); *H04W 76/14* (2018.02); *H04W 92/18* (2013.01); *H04W 52/367* (2013.01); *H04W 72/23* (2023.01); *H04W 88/06* (2013.01); *H04W 88/10* (2013.01)

(58) Field of Classification Search
CPC . H04W 52/367; H04W 72/005; H04W 72/04; H04L 67/1061
See application file for complete search history.

(56) References Cited

U.S. PATENT DOCUMENTS

| | | | |
|---|---|---|---|
| 2012/0163235 A1 | 6/2012 | Ho et al. | |
| 2013/0128858 A1* | 5/2013 | Zou | H04W 72/044 370/329 |
| 2013/0159522 A1 | 6/2013 | Hakola et al. | |
| 2013/0160101 A1 | 6/2013 | Hakola et al. | |
| 2014/0003262 A1* | 1/2014 | He | H04L 1/1854 370/252 |
| 2014/0185495 A1* | 7/2014 | Kuchibhotla | H04W 76/14 370/329 |
| 2014/0185530 A1 | 7/2014 | Kuchibhotla et al. | |
| 2014/0254572 A1 | 9/2014 | Zuniga et al. | |
| 2014/0256334 A1 | 9/2014 | Kazmi et al. | |
| 2014/0342747 A1* | 11/2014 | Lee | H04W 72/0453 455/450 |
| 2015/0245192 A1* | 8/2015 | Wu | H04W 68/00 370/329 |

FOREIGN PATENT DOCUMENTS

| | | |
|---|---|---|
| WO | 2006/016331 A1 | 2/2006 |
| WO | 2011/059820 A1 | 5/2011 |
| WO | 2012-061383 A1 | 5/2012 |
| WO | 2012/127440 A1 | 9/2012 |

OTHER PUBLICATIONS

Written Opinion issued in PCT/JP2014/053742; dated Mar. 18, 2014.
3rd Generation Partnership Project; Technical Specification Group Services and System Aspects; Feasibility study for Proximity Services (ProSe) (Release 12); pp. 1-40.
Office Action for JP2015-501455 dated Jul. 28, 2015 with an English Statement of Relevance.
The extended European search report issued by the European Patent Office dated Sep. 13, 2016, which corresponds to European Application No. 14754854.9-1855 and is related to U.S. Appl. No. 15/167,525.
An Office Action issued by the Japanese Patent Office dated Feb. 14, 2017, which corresponds to Japanese Patent Application No. 2015-226150 and is related to U.S. Appl. No. 15/167,525; with Concise Statement of Relevance; 5pp.
Qualcomm Incorporated; "Proposed solution for direct discovery and communication using E-UTRAN"; SA WG2 Meeting #95; Prague, Czech Republic; Jan. 28-Feb. 1, 2013; 11pp.
Vodafone Group; "On evaluation methodology for D2D proximity services for Public safety"; 3GPP TSG RAN WG1 #72; St. Julian's, Malta; Jan. 18-Feb. 1, 2013; 3pp.
An Office Action; "Notice of Reasons for Rejection," mailed by the Japanese Patent Office dated Jul. 11, 2017, which corresponds to Japanese Patent Application No. 2017-113521.
Nokia Corporation, Nokia Siemens Networks, "In-device interference avoidance solutions overview," 3GPP TSG-RAN WG2 Meeting #73bis, R2-111859, Shanghai, China, Apr. 11-15, 2011, 8 pp.
EP Office Action dated Nov. 3, 2017, from corresponding EP Appl No. 14 754 854.9, 6 pp.

* cited by examiner

MOBILE COMMUNICATION SYSTEM, USER TERMINAL, AND BASE STATION

CROSS-REFERENCE TO RELATED APPLICATIONS

This application is a Continuation Application of U.S. patent application Ser. No. 16/813,480 filed Mar. 9, 2020, which is a Continuation Application of U.S. patent application Ser. No. 16/183,084 filed Nov. 7, 2018, which is a Continuation Application of U.S. patent application Ser. No. 15/886,403 filed Feb. 1, 2018, which is a Continuation Application of U.S. patent application Ser. No. 15/673,949 filed Aug. 10, 2017, which is a Continuation Application of U.S. patent application Ser. No. 15/167,525 filed May 27, 2016, which is a Continuation Application of U.S. patent application Ser. No. 14/769,007 filed Aug. 19, 2015, which is the U.S. National Phase Application of International Patent Application No. PCT/JP2014/053742 filed Feb. 18, 2014, which claims benefit of U.S. Provisional Application No. 61/766,548 filed Feb. 19, 2013, the entire contents of which are incorporated herein by reference.

TECHNICAL FIELD

The present disclosure relates to a mobile communication system, a user terminal, and a base station which support D2D communication.

BACKGROUND ART

In 3GPP (3rd Generation Partnership Project) which is a project aiming to standardize a mobile communication system, it is considered to introduce communication between devices (Device to Device: D2D) as a new function to be specified in Release 12 or subsequent versions (see Non Patent Literature 1).

In the D2D communication, a plurality of neighboring user terminals perform a direct communication without passing through a network. That is, a data path of the D2D communication does not pass through the network. On the other hand, a data path of a normal communication (cellular communication) of a mobile communication system passes through the network.

CITATION LIST

Non Patent Literature

[Non Patent Literature 1] 3GPP Technical Report "TR 22.803 V2.0.0" November 2012

SUMMARY

The D2D communication is assumed to be controlled at the initiative of the network. Thus, a user terminal is considered to perform the D2D communication in a state (a connected state) in which a connection with the network has been established. However, such a method has a problem of an increase in load and signaling of the network caused by the control of the D2D communication.

Therefore, the present disclosure provides a mobile communication system capable of suppressing an increase in load and signaling of a network caused by the control of D2D communication.

A user equipment according to the present disclosure has a function of direct communication. The user equipment comprises a receiver configured to receive from a base station resource information indicating usable radio resources for data transmitted in the direct communication, and a controller configured to detect a power when receiving a radio signal directly transmitted from another user terminal. The controller is configured to determine, based on the result of the process, a radio resource used to transmit the data from among the usable radio resources indicated by the resource information.

A method according to the present disclosure is applied to a user equipment having a function of direct communication. The method comprises receiving from a base station resource information indicating usable radio resources for data transmitted in the direct communication, detecting a power when receiving a radio signal directly transmitted from another user terminal, and determining, based on the result of the process, a radio resource used to transmit the data from among the usable radio resources indicated by the resource information.

A chipset according to the present disclosure is included in a user equipment having a function of direct communication. The chipset comprises a processor and a memory coupled to the processor. The processor is configured to perform processes of receiving from a base station resource information indicating usable radio resources for data transmitted in the direct communication, detecting a power when receiving a radio signal directly transmitted from another user terminal, and determining, based on the result of the process, a radio resource used to transmit the data from among the usable radio resources indicated by the resource information.

DESCRIPTION OF EMBODIMENTS

Overview of Embodiment

A mobile communication system according to a first embodiment and a second embodiment supports a cellular communication in which a data path passes through a network, and a D2D communication that is a direct device-to-device communication in which a data path does not pass through the network. The mobile communication system includes a base station included in the network and configured to transmit broadcast information, and a user terminal configured to receive the broadcast information from the base station and then performs the D2D communication. The broadcast information is information that enables the D2D communication even in a specific state in which the user terminal does not establish a connection with the network. The user terminal performs the D2D communication in the specific state on the basis of the broadcast information.

In the first embodiment, the specific state is an idle state indicating a state in which the user terminal does not establish the connection in a coverage of the network.

In the second embodiment, the specific state is a state in which the user terminal exists out of the coverage of the network.

In the second embodiment, the base station is a base station that manages a termination cell included in a termination area of the coverage.

In the first embodiment and the second embodiment, the broadcast information includes resource information indicating a radio resource permitted to be used in one of the D2D communication and a terminal discovery process for starting the D2D communication.

In the first embodiment and the second embodiment, the broadcast information includes power information indicating a maximum transmission power permitted in one of the D2D communication and a terminal discovery process for starting the D2D communication.

In the first embodiment, the base station does not use the radio resource permitted to be used in one of the D2D communication and the terminal discovery process, in the cellular communication.

In the first embodiment, in the case of establishing the connection before performing the D2D communication, the user terminal performs the D2D communication after disconnecting the connection on the basis of the broadcast information.

In the first embodiment, in response to the detection of interference to the D2D communication from another user terminal, the user terminal performing the D2D communication transmits, to the network, information indicating a request to avoid the interference after establishing the connection or in the process of establishing the connection.

In the second embodiment, in response to the detection of interference to the D2D communication from another user terminal, the user terminal performing the D2D communication determines to stop the D2D communication and transmits information indicating the stop of the D2D communication to a terminal with which the user terminal communicates.

In the first embodiment and the second embodiment, in response to the detection of interference to the D2D communication from another user terminal, the user terminal performing the D2D communication performs negotiation between terminals such that a radio resource used in a D2D terminal group including the user terminal is different from a radio resource used in a D2D terminal group including the another user terminal.

In the first embodiment and the second embodiment, in response to the detection of interference to the D2D communication from another user terminal, the user terminal performing the D2D communication changes a radio resource used in the D2D communication to another radio resource.

In the first embodiment and the second embodiment, the user terminal, which changes the radio resource used in the D2D communication to the another radio resource, broadcasts change information indicating a change to the another radio resource by using the another radio resource.

In the second embodiment, when another user terminal, which belongs to a D2D terminal group different from the D2D terminal group including the user terminal, receives the change information during the use of the another radio resource, the another user terminal notifies a serving cell of the another user terminal of the reception of the change information.

In the first embodiment and the second embodiment, when another user terminal, which belongs to a D2D terminal group different from the D2D terminal group including the user terminal, receives the change information during the use of the another radio resource, the another user terminal notifies the user terminal of the fact that the another radio resource is being used.

In a modification of the second embodiment, the user terminal performs the D2D communication by using a frequency hopping scheme. The broadcast information includes information indicating a hopping pattern permitted to be used in the D2D communication.

A user terminal according to the first embodiment and the second embodiment is used in a mobile communication system that supports a cellular communication in which a data path passes through a network, and a D2D communication that is a direct device-to-device communication in which a data path does not pass through the network. The user terminal includes a receiver configured to receive broadcast information from a base station included in the network, and a controller configured to perform the D2D communication after the receiver receives the broadcast information. The broadcast information is information that enables the D2D communication even in a specific state in which the user terminal does not establish a connection with the network. The controller performs the D2D communication in the specific state on the basis of the broadcast information.

A base station according to the first embodiment and the second embodiment is included in a network in a mobile communication system that supports a cellular communication in which a data path passes through a network, and a D2D communication that is a direct device-to-device communication in which a data path does not pass through the network. The base station includes a transmitter configured to transmit broadcast information that enables the D2D communication even in a specific state in which a user terminal does not establish a connection with the network.

First Embodiment

Hereinafter, with reference to the drawings, a description will be provided for an embodiment in a case where D2D communication is introduced to an LTE system which is one of mobile communication systems configured based on the 3GPP standards.

LTE System

Figure 1:
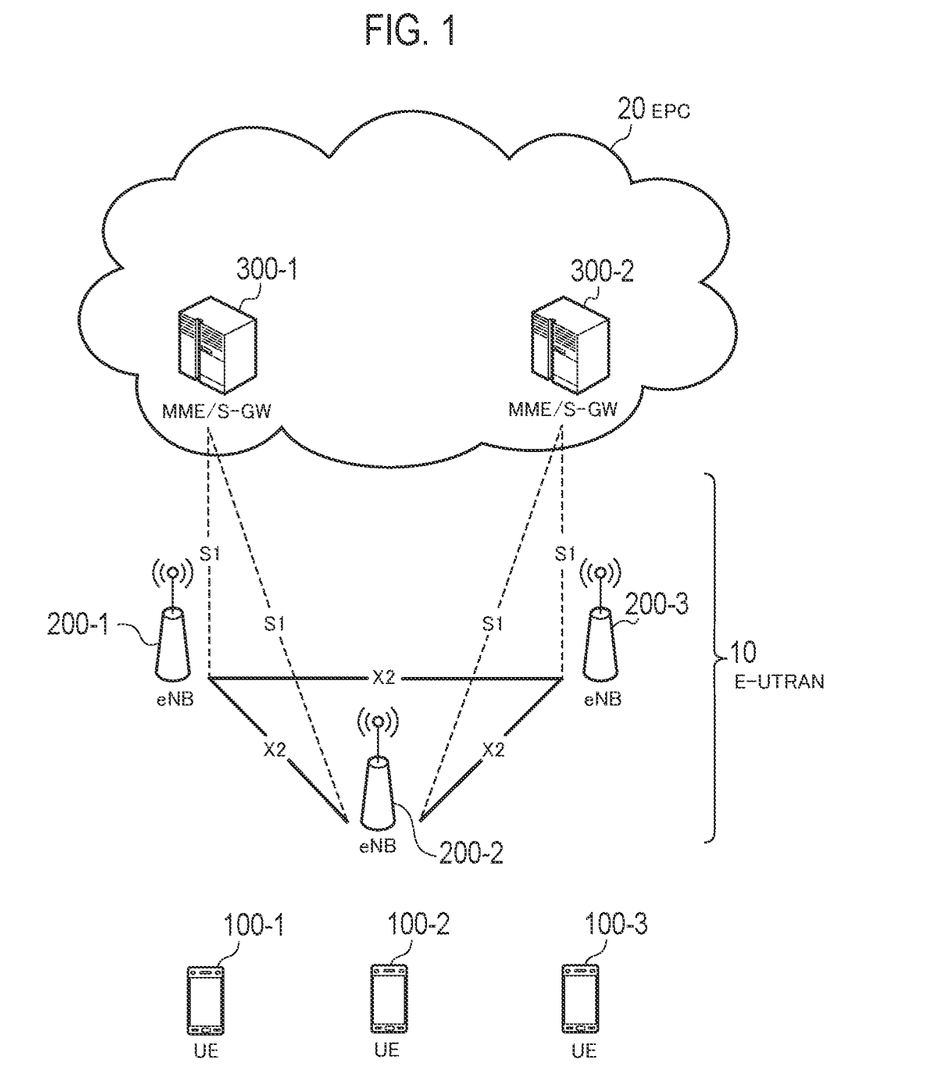
FIG. 1 is a configuration diagram of an LTE system.

FIG. 1 is a configuration diagram of an LTE system according to the first embodiment. As illustrated in FIG. 1, the LTE system includes a plurality of UEs (User Equipment) 100, E-UTRAN (Evolved-UMTS Terrestrial Radio Access Network) 10, and EPC (Evolved Packet Core) 20. The E-UTRAN 10 corresponds to a radio access network and the EPC 20 corresponds to a core network. The E-UTRAN 10 and the EPC 20 configure a network of the LTE system.

The UE 100 is a mobile communication device and performs radio communication with a cell (a serving cell) with which a connection is established. The UE 100 corresponds to the user terminal.

The E-UTRAN 10 includes a plurality of eNBs 200 (evolved Node-B). The eNB 200 corresponds to a base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100.

The eNB 200, for example, has a radio resource management (RRM) function, a function of routing user data, and a measurement control function for mobility control and scheduling.

The EPC 20 includes a plurality of MME (Mobility Management Entity)/S-GW (Serving-Gateway) 300. The MME is a network node for performing various mobility controls and the like for the UE 100 and corresponds to a controller. The S-GW is a network node that performs control to transfer user data and corresponds to a mobile switching center. The EPC 20 including the MME/S-GW 300 accommodates the eNB 200.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
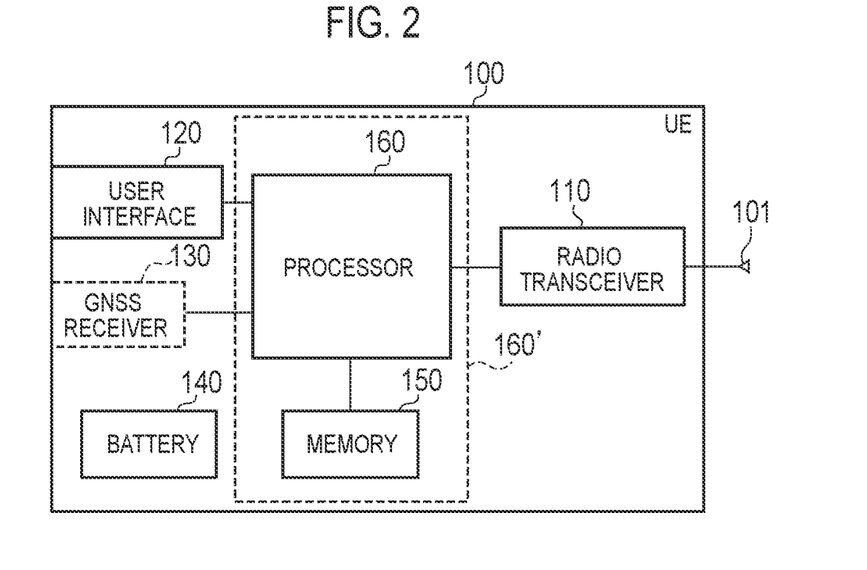
FIG. 2 is a block diagram of the UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 configure a controller. The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols which will be described later.

Figure 3:
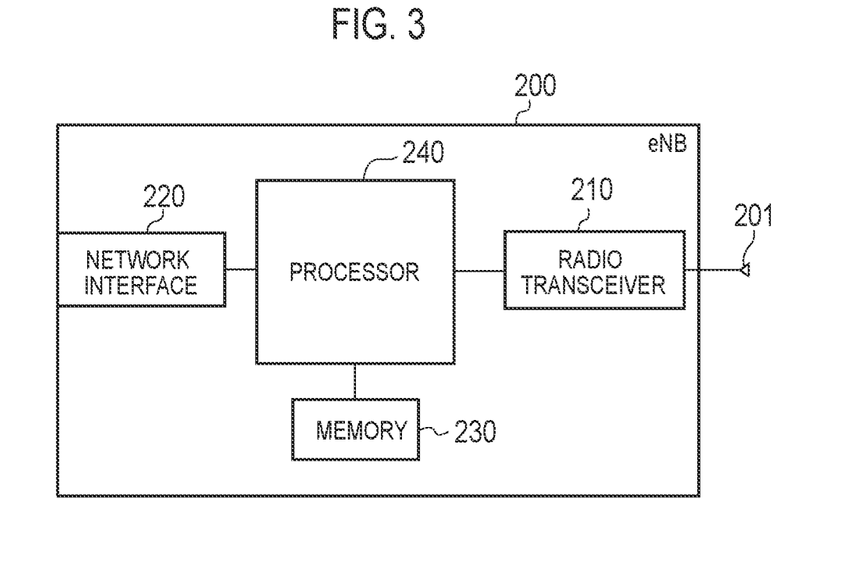
FIG. 3 is a block diagram of the eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a controller.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
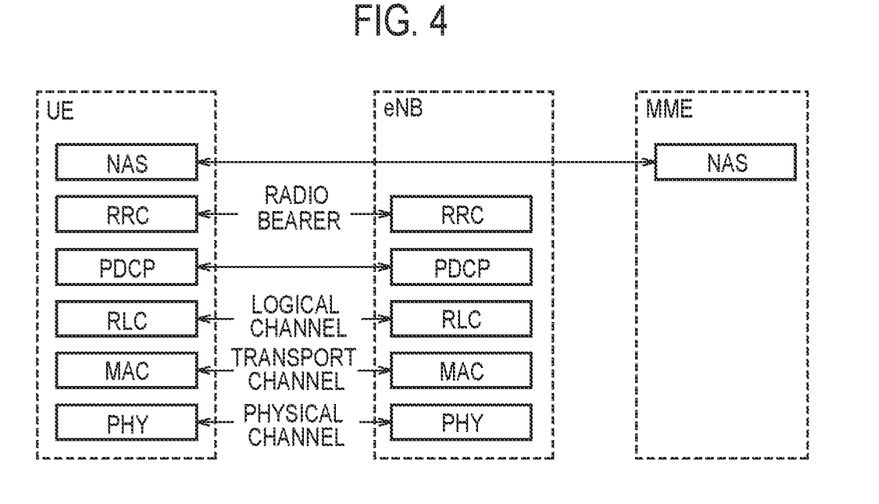
FIG. 4 is a protocol stack diagram of a radio interface in the LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size and a modulation and coding scheme (MCS)) and a scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), and when there is no RRC connection, the UE 100 is in an idle state (an RRC idle state).

A NAS (Non-Access Stratum) layer positioned above the RRC layer performs session management, mobility management and the like.

Figure 5:
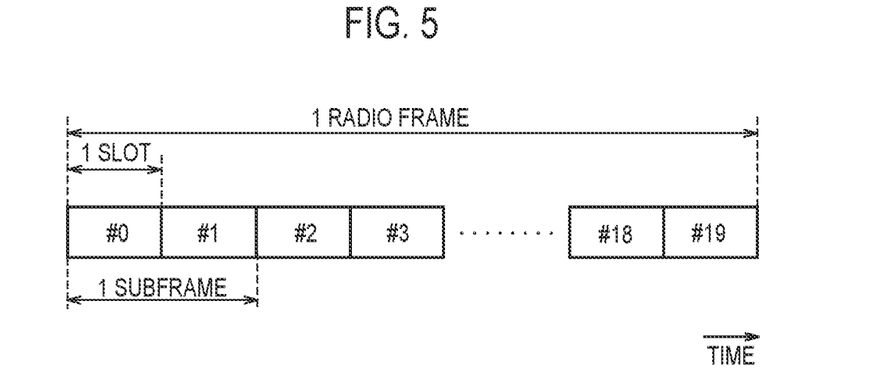
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Among radio resources assigned to the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. Further, the central portion in the frequency direction of each subframe is a region mainly capable of being used as a physical uplink shared channel (PUSCH) for transmitting user data.

D2D Communication

The LTE system according to the first embodiment supports the D2D communication that is direct communication between UEs. Hereinafter, the D2D communication will be described in comparison with normal communication (cellular communication) of the LTE system.

In the cellular communication, a data path passes through the EPC 20 that is a core network. The data path indicates a communication path of user data (a user plane). On the other hand, in the D2D communication, the data path set between the UEs does not pass through the EPC 20. Thus, it is possible to reduce traffic load of the EPC 20.

The UE 100 discovers another UE 100 existing in the vicinity of the UE 100 by a neighboring UE discovery (Discovery) process, and starts the D2D communication. The D2D communication, for example, is performed in a frequency band (a so-called licensed band) assigned to the LTE system.

The D2D communication includes a direct communication mode and a locally routed mode. In the direct communication mode, a data path does not pass through the eNB 200. A UE group (a D2D UE group) including a plurality of UEs 100 adjacent to one another directly perform radio communication with low transmission power in a cell of the eNB 200. Thus, a merit including reduction of power consumption of the UE 100 and decrease of interference to a neighboring cell can be obtained. On the other hand, in the locally routed mode, a data path passes through the eNB 200, however, not the EPC 20. The locally routed mode is able to reduce traffic load of the EPC 20, however, has a smaller merit as compared with the direct communication mode. Thus, in the first embodiment, the direct communication mode is mainly assumed.

Operation According to First Embodiment

Figure 6:
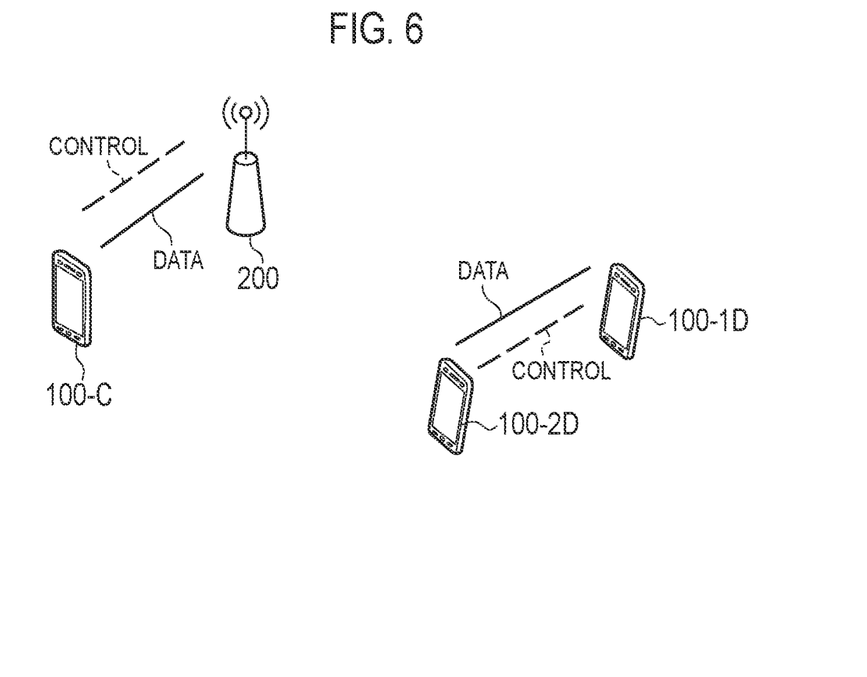
FIG. 6 is a diagram illustrating an operation environment according to a first embodiment.

Next, an operation according to the first embodiment will be described. FIG. 6 is a diagram for describing an operation environment according to the first embodiment. As shown in FIG. 6, UE 100-1D, UE 100-2D, and UE 100-C exist in the cell of the eNB 200. In the first embodiment, the UE 100-1D and the UE 100-2D perform D2D communication in the cell of the eNB 200. The UE 100-C performs cellular communication in the cell of the eNB 200. Hereinafter, a description will be provided for an operation in which the UE 100-1D and the UE 100-2D perform the D2D communication. In addition, hereinafter, the UE 100-1D and the UE 100-2D are simply written as "UE 100-D" when they are not particularly distinguished from each other.

Figure 7:
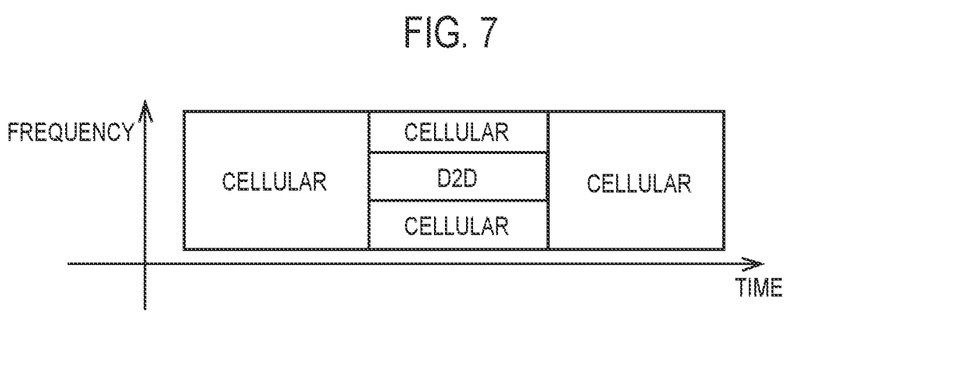
FIG. 7 is a diagram illustrating a D2D radio resource according to the first embodiment.

Firstly, the eNB 200 secures a radio resource (hereinafter, a "D2D radio resource") permitted to be used in the D2D communication. The D2D radio resource is designated by a time resource and/or a frequency resource. The time resource, for example, is a subframe. The frequency resource, for example, is a resource block and/or a frequency band. In the first embodiment, the D2D radio resource is a dedicated radio resource that is not commonly used together with a cellular radio resource for the cellular communication. FIG. 7 is a diagram illustrating a D2D radio resource according to the first embodiment. As shown in FIG. 7, among radio resources corresponding to three subframes, several resource blocks positioned at the center in the central subframe are secured as the D2D radio resource. That is, the eNB 200 does not use the D2D radio resource in the cellular communication.

Secondly, the eNB 200 transmits broadcast information (hereinafter, D2D broadcast information) that enables the D2D communication even in a specific state in which the UE 100-D does not establish an RRC connection with the network. In the first embodiment, the specific state is an idle state indicating a state in which the UE 100-D does not establish the RRC connection in a coverage of the network. The eNB 200 may periodically transmit the D2D broadcast information, or may transmit the D2D broadcast information when detecting a predetermined trigger. The D2D broadcast information may be included in a system information block (SIB) or a master information block (MIB). The SIB or the MIB is information receivable in UE 100 in an idle state. The D2D broadcast information includes resource information indicating the D2D radio resource and power information indicating maximum transmission power permitted in the D2D communication. The D2D broadcast information may also include information on a signal transmitted and received in the Discovery process (details will be described later).

Thirdly, the UE 100-D in a connected state or an idle state in the cell of the eNB 200 receives the D2D broadcast information from the eNB 200, and acquires the resource information and the power information included in the D2D broadcast information. The UE 100-D may receive the D2D broadcast information before the Discovery process, or receive the D2D broadcast information after the Discovery process.

Fourthly, the UE 100-D in an idle state starts the D2D communication on the basis of the D2D broadcast information. When the UE 100-D is in a connected state before performing the D2D communication, the UE 100-D disconnects the RRC connection and then performs the D2D communication in an idle state according to an instruction from the eNB 200 or voluntarily. The UE 100-D decides a radio resource to be used in the D2D communication from among D2D radio resources indicated by the resource information, and performs the D2D communication by using the decided radio resource. Furthermore, the UE 100-D decides transmission power to be used in the D2D communication in a range of maximum transmission power indicated by the power information, and performs the D2D communication by using the decided transmission power.

As described above, the UE 100-D performs the D2D communication in an idle state, so that it is possible to suppress an increase in load and signaling of the network caused by the control of the D2D communication.

However, during the D2D communication, the UE 100-D may receive interference from UE 100-X (a cellular UE or a D2D UE belonging to another D2D UE group) with which the UE 100-D does not communicate. Hereinafter, a description will be provided for operation patterns 1 to 3 for avoiding interference during the D2D communication.

(1) Interference Avoidance Operation Pattern 1

The UE 100-D performing the D2D communication detects interference (interference power) to the D2D communication from the UE 100-X with which the UE 100-D does not communicate. When the interference is detected, the UE 100-D transmits, to the eNB 200, information indicating a request to avoid the interference after establishing the RRC connection or in the process of establishing the RRC connection. That is, the UE 100-D transitions to a connected state and requests the eNB 200 to perform a process for avoiding the interference. In the case of establishing the RRC connection only in order to request the process for avoiding the interference, the UE 100-D may notify the eNB 200 to that effect during the process for establishing the RRC connection. As the process for avoiding the interference, the eNB 200 allows a radio resource used by the UE 100-X to be different from a radio resource used by the UE 100-D, for example. Alternatively, the eNB 200 reduces the transmission power of the UE 100-X.

(2) Interference Avoidance Operation Pattern 2

The UE 100-D performing the D2D communication detects interference (interference power) to the D2D communication from the UE 100-X with which the UE 100-D does not communicate. When the interference is detected, the UE 100-D performs negotiation between UEs in order to avoid the interference while maintaining an idle state. For example, the UE 100-D negotiates with the UE 100-X such that a radio resource used by a D2D UE group including the UE 100-D is different from a radio resource used by a D2D UE group including the UE 100-X.

(3) Interference Avoidance Operation Pattern 3

The UE 100-D, which performs the D2D communication by using a radio resource (hereinafter, a "radio resource A") included in the D2D radio resource, detects interference (interference power) to the D2D communication from the UE 100-X with which the UE 100-D does not communicate. When the interference is detected, the UE 100-D changes a radio resource used in the D2D communication to another radio resource (hereinafter, a "radio resource B") included in the D2D radio resource. Then, the UE 100-D broadcasts change information indicating a change to the radio resource B by using the radio resource B.

In this case, when UE 100-Y using the radio resource B receives the change information, the UE 100-Y notifies a serving cell (the eNB 200) of the UE 100-Y of the reception of the change information. Furthermore, the UE 100-Y broadcasts in-use information, which indicates that the radio resource B is being used, by using the radio resource B. When the in-use information is received from the UE 100-Y, the UE 100-D performs one of the following processes.

The UE 100-D stops a change to the radio resource B when the interference from the UE 100-X is reduced, and uses the radio resource A.

The UE 100-D performs the process of the interference avoidance operation pattern 1 or 2 when the interference from the UE 100-X is not reduced.

Meanwhile, when the in-use information is not received from the UE 100-Y, the UE 100-D notifies UE with which the UE 100-D communicates, of a change to the radio resource B. Then, the UE 100-D and the UE with which the UE 100-D communicates perform the D2D communication by using the radio resource B.

Figure 8:
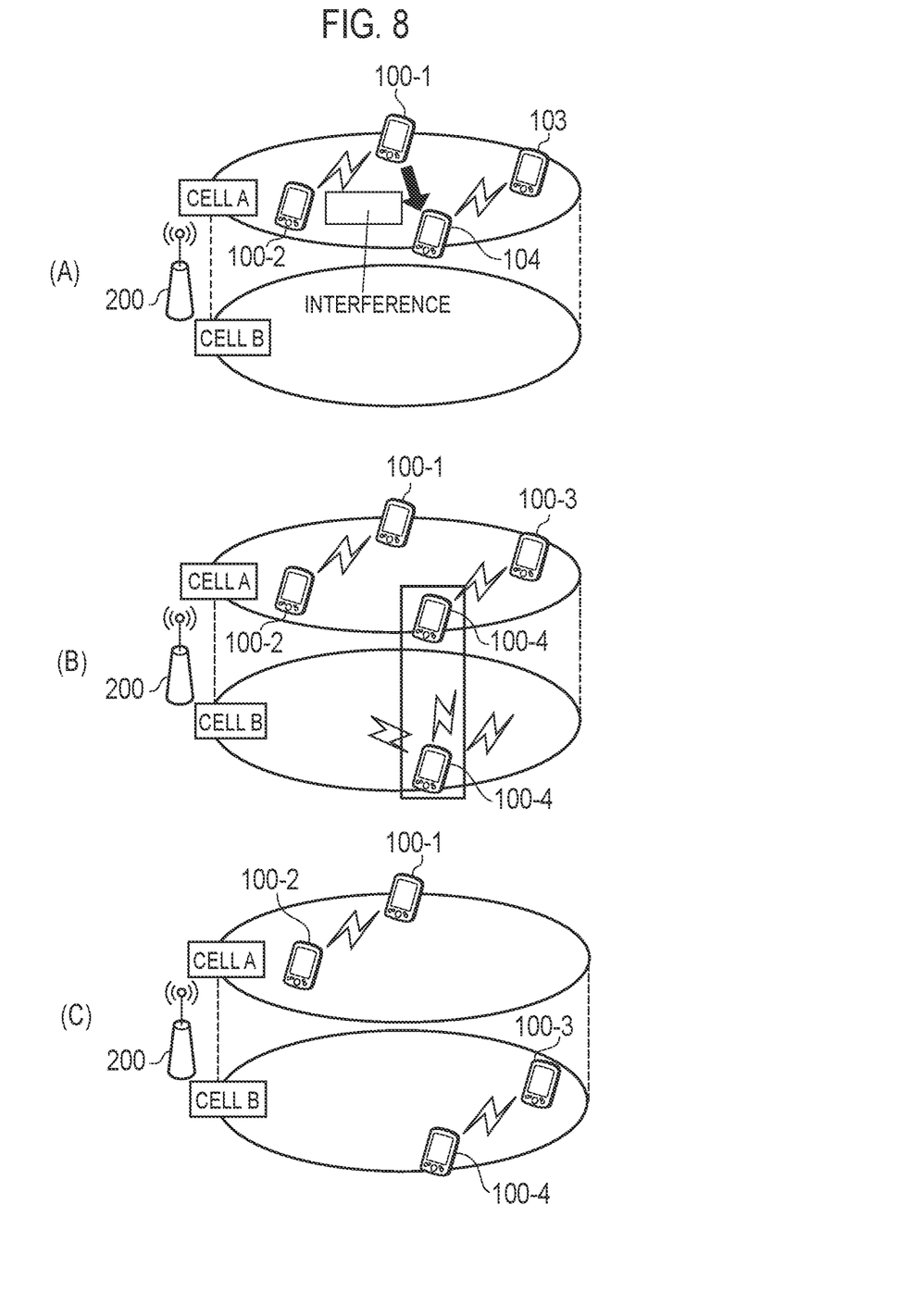
FIG. 8 is a diagram illustrating a specific example 1 of an interference avoidance operation pattern 2.

FIG. 8 is a diagram illustrating a specific example 1 of the interference avoidance operation pattern 2. In FIG. 8, a cell A is a cell belonging to a frequency band A included in the D2D radio resource, and a cell B is a cell belonging to a frequency band B included in the D2D radio resource.

As shown in FIG. 8(A), UE 100-1 and UE 100-2 constitute a D2D UE group, and UE 100-3 and UE 100-4 constitute another D2D UE group. These two D2D UE groups are adjacent to each other and use the same frequency band, resulting in the occurrence of interference between the D2D communications. Hereinafter, the case, in which the UE 100-4 detects interference from the UE 100-1, is considered.

As shown in FIG. 8(B), when interference is detected, the UE 100-4 changes a frequency band (a cell), in which D2D communication is performed, from the frequency band A (the cell A) to the frequency band B (the cell B). Then, the UE 100-D broadcasts change information, which indicates a change to the frequency band B (the cell B), in the frequency band B (the cell B).

As shown in FIG. 8(C), since no in-use information is received, the UE 100-4 notifies the UE 100-3 of a change to the frequency band B (the cell B). Then, the UE 100-3 and the UE 100-4 perform the D2D communication in the frequency band B (the cell B).

Figure 9:
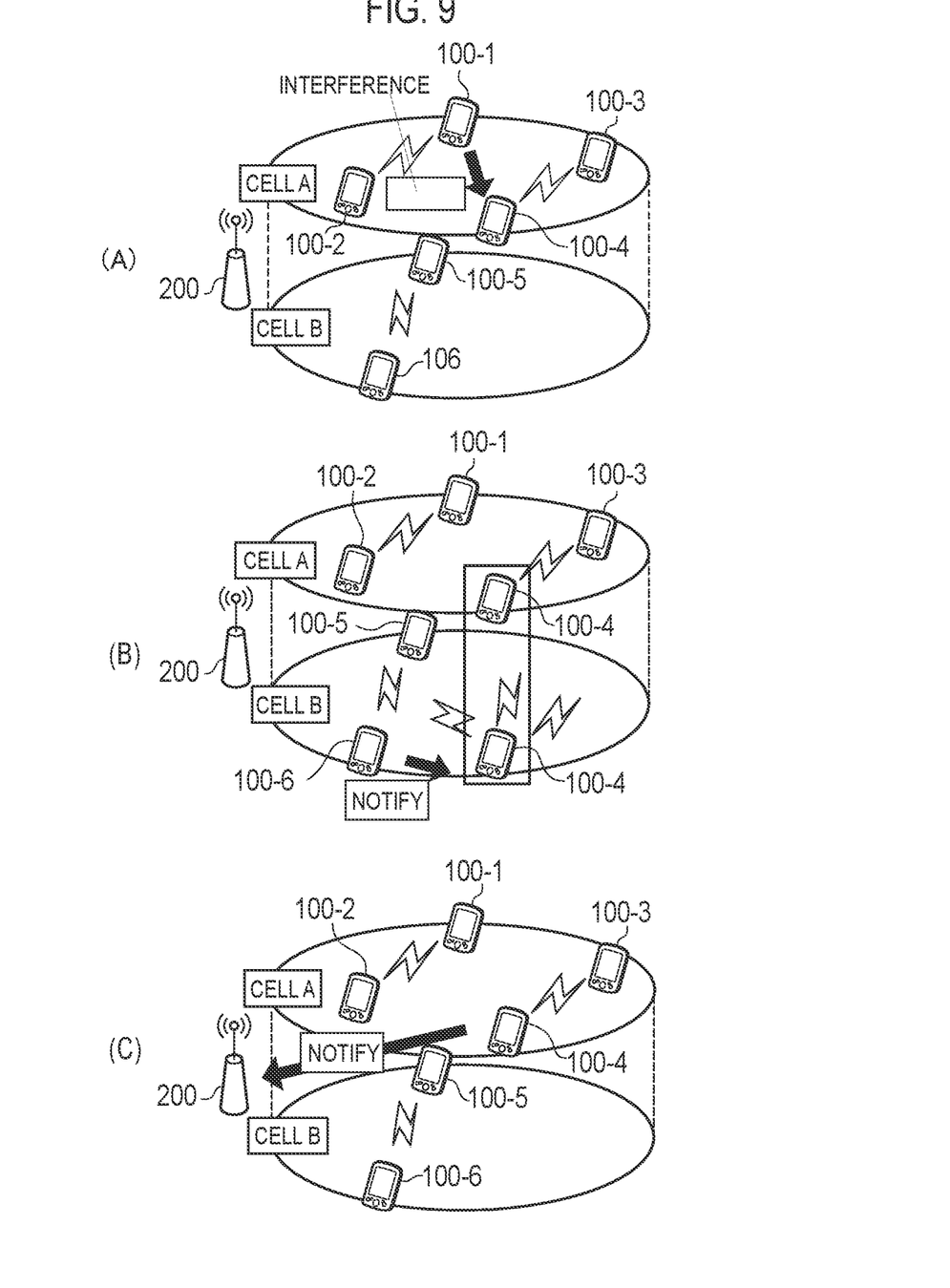
FIG. 9 is a diagram illustrating a specific example 2 of an interference avoidance operation pattern 2.

FIG. 9 is a diagram illustrating a specific example 2 of the interference avoidance operation pattern 2. Hereinafter, the difference relative to the specific example 1 will be described.

As shown in FIG. 9(A), the UE 100-4 detects interference from the UE 100-1 in the frequency band A (the cell A). Meanwhile, the UE 100-3 and the UE 100-4 perform the D2D communication in the frequency band B (the cell B).

As shown in FIG. 9 (B), the UE 100-4 broadcasts change information, which indicates a change to the frequency band B (the cell B), in the frequency band B (the cell B). UE 100-6 receives the change information from the UE 100-4, and broadcasts (or notifies) in-use information, which indicates that the frequency band B (the cell B) is being used, in the frequency band B (the cell B). The UE 100-4 receives the in-use information from the UE 100-6.

As shown in FIG. 9(C), since the interference from the UE 100-2 is not reduced, the UE 100-4 which has received the in-use information performs the process of the interference avoidance operation pattern 1 or 2.

Second Embodiment

Next, a second embodiment will be described. In the second embodiment, the specific state is a state (hereinafter, an "out-of-service state") in which the UE 100-D exists out of a coverage of the network. The coverage is not limited to a coverage of an LTE network, and may be coverages of all networks operated by the same communication provider. Furthermore, out-of-coverage indicates both an area in which radio waves from the network do not reach, and an area in which the radio waves from the network are severely weak. An area out of the coverage is called an "out-of-range area".

In the second embodiment, the eNB 200, which transmits D2D broadcast information, manages a termination cell included in a termination area of the coverage. In the termination cell, at least a part of a periphery thereof is the out-of-range area. That is, the eNB 200 transmits the D2D broadcast information in the termination cell. The eNB 200 may be notified of information regarding whether the cell of the eNB 200 is the termination cell from the EPC 20.

Hereinafter, an operation according to the second embodiment will be explained while focusing on the difference relative to the first embodiment.

The eNB 200 transmits D2D broadcast information that enables D2D communication even though the UE 100-D is in the out-of-service state. The D2D broadcast information includes information (termination cell information) indicating that the D2D communication is permitted in the out-of-range area, in addition to resource information indicating a D2D radio resource and power information indicating maximum transmission power permitted in the D2D communication.

The UE 100-D in a connected state or an idle state in the cell of the eNB 200 receives the D2D broadcast information from the eNB 200. Then, the UE 100-D transitioned to the out-of-service state performs a Discovery process on the basis of the D2D broadcast information, and then performs the D2D communication.

As described above, the UE 100-D performs the D2D communication in the out-of-service state, so that it is possible to effectively utilize the D2D communication and to enable communication even in the out-of-service state.

Furthermore, in the second embodiment, among the interference avoidance operations according to the first embodiment, an interference avoidance operation, other than the operation (that is, the interference avoidance operation pattern 1) to request the eNB 200 to avoid the interference, is applicable.

Moreover, in the second embodiment, instead of the aforementioned interference avoidance operation pattern 1, an operation for stopping the D2D communication may be performed. In this case, in response to the detection of interference to the D2D communication from the UE 100-X, the UE 100-D determines to stop the D2D communication and transmits information indicating the stop of the D2D communication to a communication destination.

Modification of Second Embodiment

In the second embodiment, since it is difficult to request the eNB 200 to avoid the interference, D2D communication may be performed using a frequency hopping scheme in order to attenuate the influence of interference.

Figure 10:
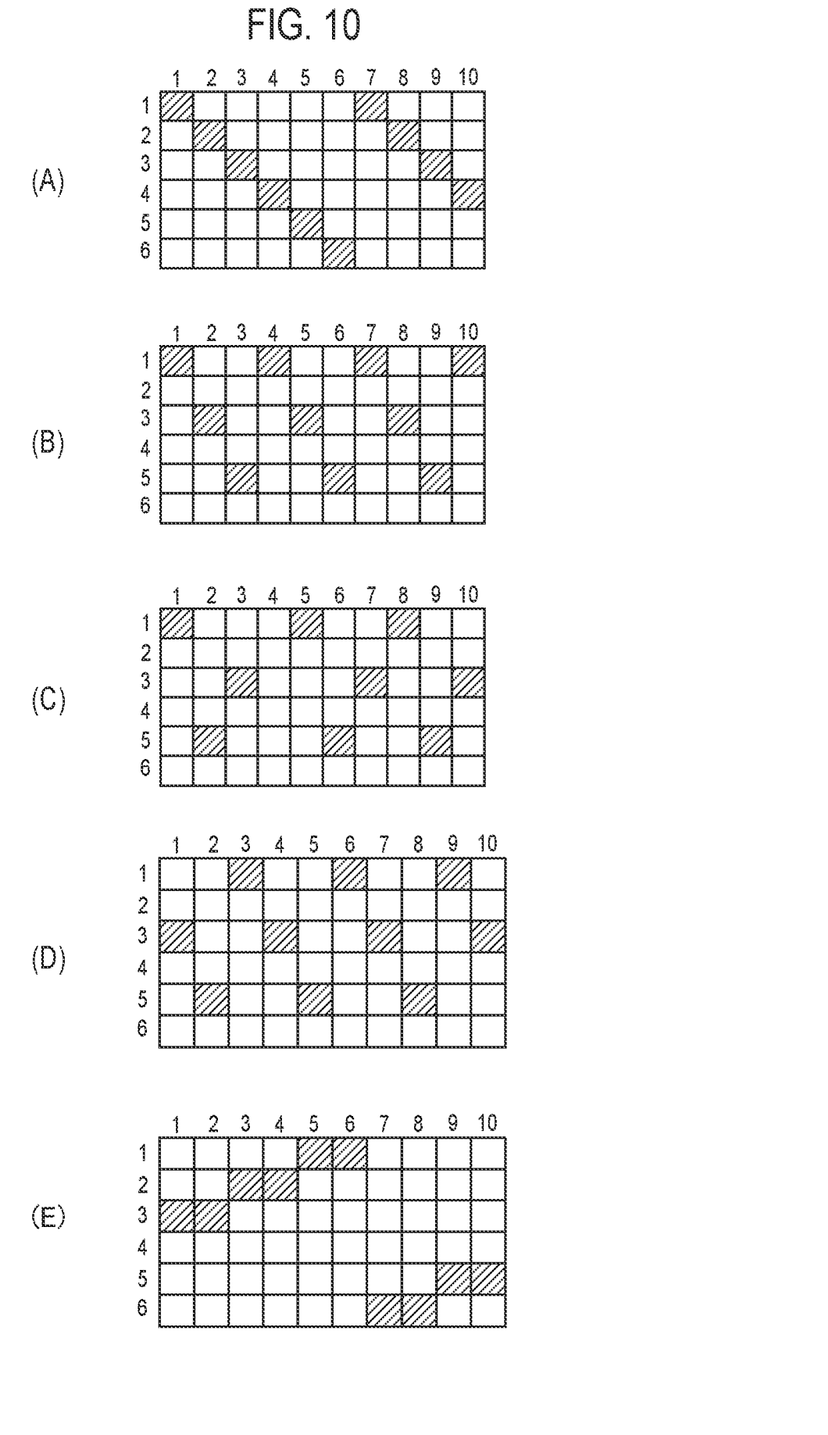
FIG. 10 is a diagram illustrating a specific example of a candidate of a hopping pattern.

In the present modification, the D2D broadcast information includes information on a hopping pattern (candidates of the hopping pattern) permitted to be used in the D2D communication. However, the UE 100-D may hold the candidates of the hopping pattern in advance. FIG. 10 is a diagram illustrating a specific example of the candidates of the hopping pattern. In FIG. 10, a horizontal axis denotes a time axis and indicates 10 subframes corresponding to one radio frame. A vertical axis denotes a frequency axis and indicates a bandwidth corresponding to six resource blocks.

The UE 100-D selects a hopping pattern to be used in the D2D communication from the candidates of the hopping pattern, and notifies a communication destination of the selected hopping pattern. The UE 100-D performs the D2D communication by using the selected hopping pattern.

When the UE 100-D detects interference from the UE 100-X using the same hopping pattern, the UE 100-D may decide the right of use of the hopping pattern by negotiation between UEs. When it is not possible to use the selected hopping pattern, the UE 100-D reselects another hopping pattern from the candidates of the hopping pattern, and notifies the communication destination of the selected hopping pattern. The UE 100-D performs the D2D communication by using the reselected hopping pattern.

In addition, as well as the case of selecting (or reselecting) a hopping pattern from the candidates of the hopping pattern, the corresponding UE may hold a UE-specific hopping pattern and perform the D2D communication by using the UE-specific hopping pattern. The hopping pattern may be calculated from a UE-specific ID, an ID of a cell in which the UE exists, a temporary ID (C-RNTI) assigned from the corresponding cell to the UE, and so on.

Other Embodiments

In each of the aforementioned embodiments, the D2D broadcast information may include information on a signal (Discovery signal) transmitted and received in the Discovery process. The Discovery signal is a signal for discovering neighboring UE or a signal for being discovered by the neighboring UE. The information on the Discovery signal includes resource information indicating radio resources (Discovery radio resources) permitted to be used in the Discovery process, and power information indicating maximum transmission power (Discovery maximum transmission power) permitted in the Discovery process. In this case, the UE 100-D decides a radio resource used in the transmission of the Discovery signal from the Discovery radio resources indicated by the resource information, and transmits the Discovery signal by using the decided radio resource. Furthermore, the UE 100-D decides transmission power of the Discovery signal in a range of the Discovery maximum transmission power indicated by the power information, and transmits the Discovery signal by using the decided transmission power.

Each the embodiments and the modification mentioned above may be performed separately and independently and may also be performed through a combination thereof.

In the aforementioned second embodiment and the modification thereof, a parameter (a radio resource, maximum transmission power and so on) necessary for the D2D communication may be statically decided and the UE 100-D may hold information (the parameter) thereof. In this case, the UE 100-D can perform the D2D communication by using the held parameter regardless of the D2D broadcast information (and the termination cell information).

Each of the aforementioned embodiments has described an example in which the present disclosure is applied to the LTE system. However, the present disclosure may also be applied to systems other than the LTE system, as well as the LTE system.

Thus, the present disclosure includes a variety of embodiments not described herein as a matter of course. Further, it is possible to combine embodiments and modifications described above. Therefore, the technical scope of the present disclosure is defined only by the matters according to claims based on the above description.

INDUSTRIAL APPLICABILITY

According to the present disclosure, it is possible to provide a mobile communication system, a user terminal, and a base station capable of suppressing an increase in load and signaling of a network caused by the control of D2D communication.

The invention claimed is:

1. A user equipment having a function of direct communication, comprising:
a receiver configured to receive a system information block (SIB) from a base station via a broadcast signaling, the SIB including resource information indicating usable radio resources for data transmitted in the direct communication;
a controller configured to perform a process of detecting a received power of a radio signal directly transmitted from another user terminal, wherein
the controller is configured to determine, based on a result of the process, a radio resource used to transmit the data from among the usable radio resources indicated by the resource information, wherein the determined radio resource is not used by the another user terminal.

2. A method applied to a user equipment having a function of direct communication, the method comprising:
receiving a system information block (SIB) from a base station via a broadcast signaling, the SIB including resource information indicating usable radio resources for data transmitted in the direct communication;
performing a process of detecting a received power of a radio signal directly transmitted from another user terminal; and
determining, based on a result of the process, a radio resource used to transmit the data from among the usable radio resources indicated by the resource information, wherein the determined radio resource is not used by the another user terminal.

3. A chipset included in a user equipment having a function of direct communication, the chipset comprising:
a processor and a memory coupled to the processor, the processor configured to perform processes of:
receiving system information block (SIB) from a base station via a broadcast signaling, the SIB including resource information indicating usable radio resources for data transmitted in the direct communication;
performing a process of detecting a received power of a radio signal directly transmitted from another user terminal; and
determining, based on a result of the process, a radio resource used to transmit the data from among the usable radio resources indicated by the resource information, wherein the determined radio resource is not used by the another user terminal.

* * * * *